No. 663,081. Patented Dec. 4, 1900.
R. C. JARVIS.
FEED BOX.
(Application filed Feb. 10, 1900.)
(No Model.)
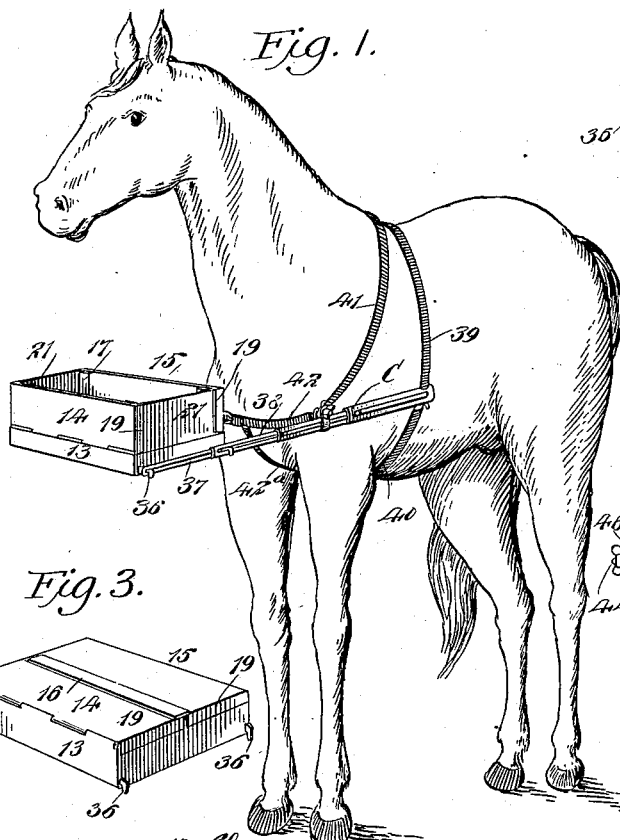

UNITED STATES PATENT OFFICE.

ROBERT C. JARVIS, OF CHICAGO, ILLINOIS.

FEED-BOX.

SPECIFICATION forming part of Letters Patent No. 663,081, dated December 4, 1900.

Application filed February 10, 1900. Serial No. 4,783. (No model.)

*To all whom it may concern:*

Be it known that I, ROBERT C. JARVIS, a citizen of the United States, residing at Chicago, (West Pullman,) in the county of Cook and State of Illinois, have invented a new and Improved Feed-Box, of which the following is a full, clear, and exact description.

One purpose of my invention is to so construct the feed-box for a team of horses or for a single animal that it may be readily attached to the body of an animal and held in convenient position for feeding or be quickly secured to a pole or tongue and expeditiously removed therefrom.

Another purpose of the invention is to provide a feed-box in which the feed may be packed and stored and the box be used as a seat when not needed for feeding purposes, the box being capable of attachment to the body of the vehicle in like manner as an ordinary seat.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved feed-box attached to an animal and supported from the body of said animal. Fig. 2 is a plan view of the box shown in Fig. 1 and the main supports therefor. Fig. 3 is a perspective view of the box shown in Fig. 1 folded and closed. Fig. 4 is a perspective view, on an enlarged scale, of the improved feed-box in an open position and adapted for attachment to the pole or tongue of a vehicle. Fig. 5 is an end view of the box shown in Fig. 4, illustrating its attachment to a pole or tongue; and Fig. 6 is a side elevation of the feed-box shown in Figs. 4 and 5, the feed-box being closed and the pole to which it is attached being shown in section.

The box may be and usually is provided with a base A, consisting of an outwardly and downwardly extending side flange 10 and correspondingly-shaped end flanges 11, whereby when the feed-box is reversed and the base is brought uppermost the bottom 12 of the box will serve as a seat and the base-flanges 10 and 11 as rails or guards for the seat.

At the bottom 12 of the box, upon all four sides, a marginal flange 13 is formed of any desired height, and side pieces 14 and 15 are hinged to the side marginal flanges 13 in such manner that the side pieces 14 and 15 may fold inward horizontally, engaging with each other when folded, as shown in Fig. 3, so as to completely close the box, and in order that a locking engagement may be effected between the two hinged sides 14 and 15 one of the sides—the side 14, for example—is provided with parallel strips 16, secured at opposite sides of its upper longitudinal edge, whereby when the hinged side 14 is folded downward the space between the parallel pieces 16 will receive the free longitudinal edge of the opposing hinged side 15. Vertical plates 17 are secured to the inner faces of the hinged side pieces 14 and 15 adjacent to their ends, and these plates 17 are so shaped that a slideway 18 is formed between them and the opposing surfaces of the hinged side pieces 14 and 15. The end portions of the hinged side pieces are bent in direction of each other at a right angle to their longitudinal axes, forming end flanges 19, which flanges when the side pieces 14 and 15 are closed upon the body portion of the box extend down along the end portions of the body-flanges 13, as shown in Fig. 3. The ends of the box are closed by plates 21, the ends 20 whereof are bent inward at a right angle to their body portions, and the said plates are adapted to slide between the end flanges 19 of the hinged side pieces 14 and 15 and the guide-plates 17, while the end flanges of the end plates 21 enter the slideways above mentioned as occurring between the guide-plates 17 and the hinged sides 14 and 15, as is illustrated in Figs. 2 and 4.

When the side pieces 14 and 15 of the box are folded down to form the cover therefor, they may be held in their folded position by producing apertures 22 in the end flanges 19 of the side pieces 14 and 15, which apertures 22, in the folded position of the side pieces, are brought in registry with apertures 23 in the end flanges 13 of the body, and spring-hooks 24, attached to the end base-flanges 11, are made to enter the said registering apertures 22 and 23.

When the box is folded, the end sections 21 are first placed in the box with their angular ends close thereto, and then the hinged side pieces 14 and 15 are folded and locked, as described.

When the box is made sufficiently large to accommodate the animals of a team, the box is supported upon the tongue or pole B and is held thereon through the medium of two pairs of abutting rods 25, having sliding movement in apertures produced in the end base-flanges 11. The inner end of each rod 25 of a pair is provided with a downwardly-extending head 26, and the heads are recessed in order to receive between them the pole or tongue B. The heads of each pair of rods 25 are linked or otherwise pivotally connected at 27 at their upper ends or above the pole or tongue. One of the heads 26 is provided with a semicircular recess 28 in its outer edge near the bottom, and said recesses are adapted to receive the cam-heads 29 of levers 31, which levers are pivotally connected by open links 30 or their equivalents with the heads 26 opposite the heads with which the cam-surfaces of the lever are to engage. When the levers 31 are brought in binding engagement with the heads 26 with which they are to engage, the levers are held in such position by keepers 32, which are free to slide on the bars or rods 25, as shown in Fig. 6. In order that the pairs of rods 25 shall not revolve, the outer ends of one set or of both sets of rods are provided with longitudinal grooves 33, into which hooks 34 enter, the hooks being pivoted to the box at its ends, as shown in Figs. 4 and 5.

In Figs. 1 and 2 I have illustrated a means for securing a box to the body of a single animal and supporting the box in such position that the contents of the box may be readily reached by the animal when it desires to feed. This supporting mechanism C consists of side bars made in telescopic sections 38, each of which sections is preferably provided with a longitudinal slot 37, and these slots 37 are adapted to receive arms 36, which are slidable in the base portion of the box and terminate at their outer ends in hook-sections, whereby they may be readily entered into the slots of the supports 38. Usually the front hooks or arms 36 of the box are made to enter the slots 37 of the front sections of the supports 38 and the rear hooks the slots in one of the intermediate sections, as shown in Figs. 1 and 2. A saddle-strap 39 is attached to the inner sections of the supports C, and the said saddle-strap 39 is passed over the back of the animal and is secured to the innermost sections of the supports in any suitable or approved manner, and a strap 40, which is equivalent to a belly-band, is likewise attached to the innermost sections of the supports C and is passed beneath the body of the animal, as is also shown in Fig. 1. Another upper supporting-strap 41, which may be termed a "neck-strap," is also used in connection with the supports C, and this upper and forward strap 41 is usually connected with the intermediate sections of the said supports C, and in connection with this strap 41 a breast-strap 42 is employed, and what may be termed a "martingale-strap" 42ª, which connects with the breast-strap 42 and with the belly-band strap 40. The forward upper strap 41 and the breast-strap 42 are adapted to be adjustably connected with the supports C, and to that end, preferably, clips 43 are employed, which embrace the rearward intermediate sections of the supports, extending above the upper portions thereof, and bolts 44 are passed through the upper portions of these clips, provided with thumb-screws or their equivalents, and each bolt 44 at its inner end is provided with an eye 45, in which eyes the ends of the breast-strap 42 may be clipped in the customary manner, whereas the ends or terminals of the upper front strap 41 are attached to the bolts 44, between the members of the clips 43, through the medium of suitable straps 46 or the equivalents of the same. In this manner the feed-box is held firmly on the body of the animal and in such a position that the mouth of the animal may conveniently enter the box and take feed therefrom.

In dotted lines in Fig. 6 I have illustrated a holder 47, which is preferably of spring material and consists of crossed longitudinal and transverse bars having their ends upturned to receive the feed-box, and when the feed-box has been closed and assumed the position shown in Fig. 3 the box is reversed and the spring-support 47 is made to engage in any suitable or approved manner with the sides of the vehicle-body or with springs of the character usually employed to support a seat, and when the base-flanges 10 and 11 are employed in the reversed position of the box these flanges constitute guards for the body of the occupant of the seat.

Having thus described my invention, I claim as new and desire to secure by Letters Patent—

1. A feed-box comprising a base, a flange extending upward from the bottom of the base, side pieces having hinged connection with the said flanges, and end pieces having sliding engagement with the side pieces.

2. In a feed-box, a base, side pieces hinged to the base and arranged to fold over the same, an interlocking connection between the side pieces, slideways carried by the said side pieces, and end pieces adapted to enter the said slideways and hold the side pieces in an upright position.

3. A feed-box consisting of a bottom, a side flange and end flanges outwardly and downwardly projected from the said bottom, side pieces hinged to the base portion of the box, slideways carried by the side pieces of the box, and removable end pieces arranged to enter the said slideways and hold the side pieces in upright or open position, as specified.

4. The combination, with a feed-box, of rods secured thereto and movably connected with each other, the inner ends of said rods being located about centrally with respect to the feed-box, and a clamping device carried by said inner ends and adapted to fasten the box upon a tongue or pole.

5. The combination, with a feed-box, of rods arranged to slide thereon and provided at their adjacent ends with pivotally-connected heads forming together a clamp for a tongue or pole, and a device for locking said rods together.

6. In a feed-box, flanges extending outward from the sides and the ends of the box, rods arranged in pairs, having sliding movement in the said flanges, the inner ends of the rods of each pair being provided with heads having pivotal connection and arranged for clamping engagement with a tongue or a pole, and a lock-lever connected with a head of each pair of rods, and arranged for clamping engagement with the opposing heads of the same pairs of rods, as set forth.

In testimony whereof I have signed my name to this specification in the presence of two subscribing witnesses.

ROBERT C. JARVIS.

Witnesses:
FRANK A. CULLEN,
GEO. F. ROBERTS.